United States Patent
Murphy et al.

(10) Patent No.: US 11,727,030 B2
(45) Date of Patent: Aug. 15, 2023

(54) AUTOMATIC HOT AREA DETECTION IN HEAT MAP VISUALIZATIONS

(71) Applicant: BUSINESS OBJECTS SOFTWARE LTD., Dublin (IE)

(72) Inventors: Ben Murphy, Dublin (IE); Ying Wu, Maynooth (IE); Paul O'Hara, Dublin (IE); Emmet Norton, Naas (IE); Malte Christian Kaufmann, Clonskeagh (IE); Orla Cullen, Dublin (IE)

(73) Assignee: Business Objects Software Ltd., Dublin (IE)

( * ) Notice: Subject to any disclaimer, the term of this patent is extended or adjusted under 35 U.S.C. 154(b) by 253 days.

(21) Appl. No.: 16/867,036

(22) Filed: May 5, 2020

(65) Prior Publication Data

US 2021/0349911 A1    Nov. 11, 2021

(51) Int. Cl.
*G06F 16/25*    (2019.01)
*G06F 16/28*    (2019.01)
*G06F 7/14*     (2006.01)

(52) U.S. Cl.
CPC .............. *G06F 16/258* (2019.01); *G06F 7/14* (2013.01); *G06F 16/285* (2019.01)

(58) Field of Classification Search
CPC ......... G06F 16/258; G06F 16/285; G06F 7/14
See application file for complete search history.

(56) References Cited

U.S. PATENT DOCUMENTS

| 7,650,644 B2 | 1/2010 | Cheng et al. | |
| 2003/0020732 A1* | 1/2003 | Jasa | G06T 5/006 345/645 |
| 2010/0159437 A1* | 6/2010 | German | G09B 7/02 707/E17.046 |
| 2013/0181993 A1* | 7/2013 | Herring | G06T 11/206 345/440 |
| 2017/0364818 A1 | 12/2017 | Wu et al. | |
| 2018/0150547 A1 | 5/2018 | Pallath et al. | |
| 2018/0165599 A1 | 6/2018 | Pete et al. | |

(Continued)

OTHER PUBLICATIONS

Originlab. Oct. 31, 2017. "11.3 The Quick Peaks Gadget". OriginLab Corporation https://web.archive.org/web/20171031011920/https://www.originlab.com/doc/Origin-Help/Gadget-QuickPeaks (Year: 2017).*

(Continued)

*Primary Examiner* — Mark D Featherstone
*Assistant Examiner* — Brooks T Hale
(74) *Attorney, Agent, or Firm* — Fish & Richardson P.C.

(57) ABSTRACT

The present disclosure involves systems, software, and computer implemented methods for automatically detecting hot areas in heat map visualizations. One example method includes identifying a two-dimensional heat map. The identified two-dimensional heat map is converted to a one-dimensional heat map. Cells of the one-dimensional heat map are clustered using a density-based clustering algorithm to generate at least one dense region of cells. A mean value of cells in each dense region is calculated and the dense regions are sorted by mean value in descending order. An approach for identifying hot areas is selected and the selected approach is used to identify at least one dense region as a hot area of the one-dimensional heat map.

20 Claims, 6 Drawing Sheets

(3 of 6 Drawing Sheet(s) Filed in Color)

(56) References Cited

U.S. PATENT DOCUMENTS

| | | |
|---|---|---|
| 2018/0285769 A1 | 10/2018 | Wu et al. |
| 2019/0179835 A1* | 6/2019 | Pallath et al. |
| 2019/0197057 A1* | 6/2019 | Yan ..................... G06K 9/6222 |
| 2020/0098055 A1 | 3/2020 | O'Hara et al. |

OTHER PUBLICATIONS

Fisher et al. Apr. 23, 2004. Mean Filter. https://web.archive.org/web/20040604214851/https://homepages.inf.ed.ac.uk/rbf/HIPR2/mean.htm (Year: 2004).*
Robertson et al. Oct. 13, 2016. "Find the difference between positive and negative peaks MATLAB". Stack Exchange Inc https://stackoverflow.com/questions/40017761/find-the-difference-between-positive-and-negative-peaks-matlab (Year: 2016).*
Sadeghi. Dec. 8, 2016. "Dimensionality Reduction". University of Washington. https://web.archive.org/web/20161208000136/https://courses.cs.washington.edu/courses/csep546/16sp/slides/PCA_csep546.pdf (Year: 2016).*
U.S. Appl. No. 16/876,441, filed May 18, 2020, Wu et al.
U.S. Appl. No. 16/876,463, filed May 18, 2020, O'Hara et al.
U.S. Appl. No. 16/877,909, filed May 19, 2020, O'Hara et al.
U.S. Appl. No. 16/890,430, filed Jun. 2, 2020, Banerjee et al.
Wikipedia.org [online], "DBSCAN" available on or before Mar. 31, 2008, via Internet Archive: Wayback Machine URL <https://web.archive.org/web/2008033121474/http://en.wikipedia.org/wiki/DBSCAN>, retrieved on Jun. 4, 2020, URL<http://en.wikipedia.org/wiki/DBSCAN>, 3 pages.

* cited by examiner

AUTOMATIC HOT AREA DETECTION IN HEAT MAP VISUALIZATIONS

TECHNICAL FIELD

The present disclosure relates to computer-implemented methods, software, and systems for automatically detecting hot areas in heat map visualizations.

BACKGROUND

A heat map can be used to visualize data. A heat map is a graphical representation of data in which different data values are represented by and shown using different colors. Different type of color schemes can be used, with different colors having different meanings for different applications or different types of data.

SUMMARY

The present disclosure involves systems, software, and computer implemented methods for automatically detecting hot areas in heat map visualizations. An example method includes: identifying a two-dimensional heat map; converting the identified two-dimensional heat map to a one-dimensional heat map; clustering cells of the one-dimensional heat map using a density-based clustering algorithm to generate at least one dense region of cells; calculating a mean value of cells in each dense region; sorting the dense regions by mean value in descending order; selecting an approach for identifying hot areas; and using the selected approach to identify at least one dense region as a hot area of the one-dimensional heat map.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
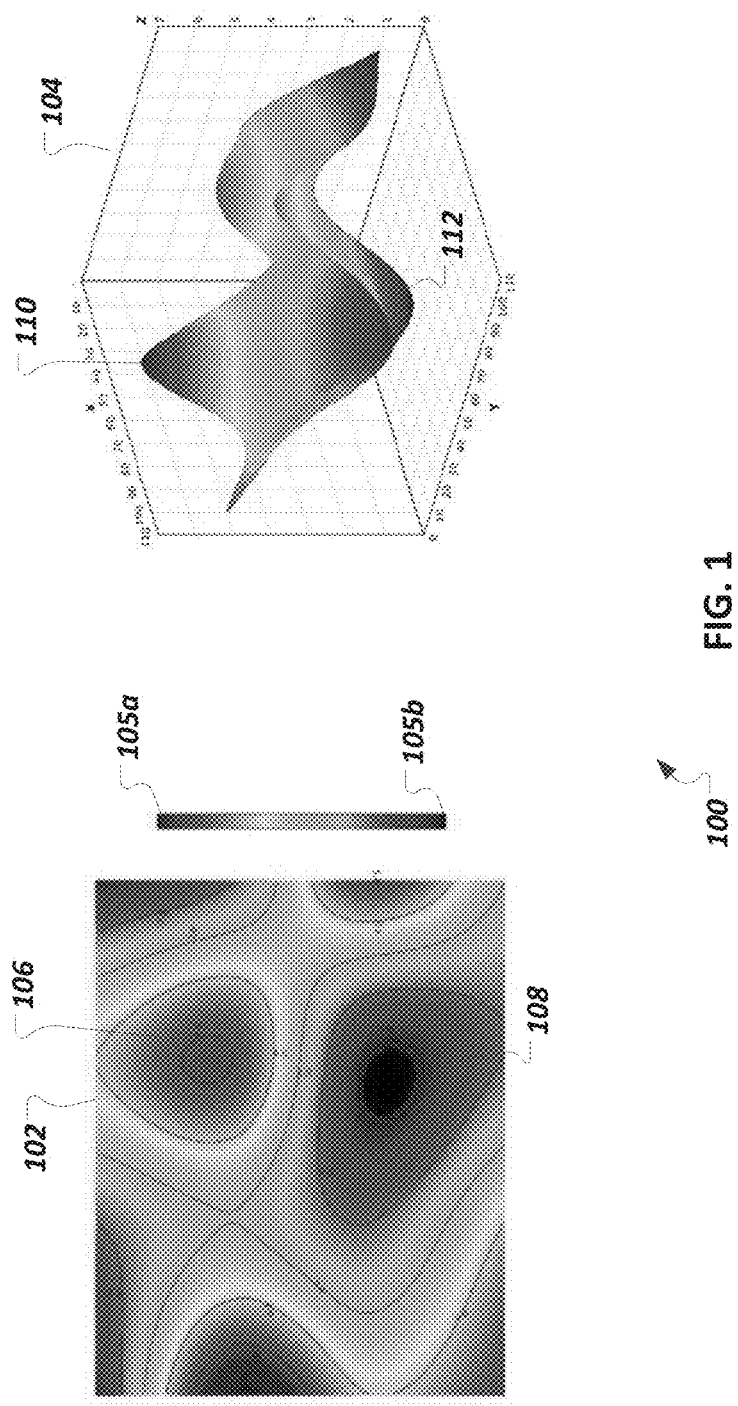
FIG. 1 illustrates an example two-dimensional heat map and an example three-dimensional heat map.

Heatmaps can be useful for data visualization. Hot areas, or areas of interest, on a heatmap may be areas that are most interesting to a user. Different approaches can be used to detect hot areas in a heatmap.

For example, given cell values visualized in a heatmap, the end-user can manually adjust a threshold value where all cells containing values above or below the specified threshold are regarded as being inside a hot area. For instance, the end-user can use domain knowledge to manually identify suitable hot areas which show expected patterns. Manual approaches can have various disadvantages, however.

For instance, when hot areas are identified through manual interaction, human knowledge and effort are required. It can be difficult to guarantee that sufficient human knowledge and/or experience exists in an organization and there can be uncertainty regarding whether a particular manual attempt correctly reflects overall human experience. Additionally, when multiple end users are involved, it can be difficult to have a consistent understanding of what is considered to be a hot area.

A more automatic method for hot area detection can be where a candidate hot area is initially proposed. An initial area can be a predefined shape of hot area and can be centered on a specified cell (e.g., a cell with a lowest or highest value). Additional cells around the candidate hot area can be added to enlarge the initial hot area, where a difference between values in the current hot area and values outside of the hot area are compared. The hot area can be enlarged when the difference between values of cells inside the hot area and outside of the hot area is less than a threshold, for example. However, repeating a cell-by-cell comparison for each cell can result in unacceptable processing times, with processing times further lengthened when multiple hot area detections of different candidate areas are performed. Additionally, identifying both positive and negative peak areas simultaneously can be difficult and also resource intensive. Also, an assumed predefined shape for candidate areas that is selected before extracting hot area candidates may not represent a shape of an actual hot area.

To address the limitations described above, an improved automatic hot area detection approach can be used. The improved approach can utilize an assumption that underlying patterns existing in cell values can be visualized as hot areas in a heatmap. The underlying patterns can include cell values that have high correlation(s). For example, when cell values are regarded as data points in a one-dimensional data space, some cell values can have proximity in a dense region. The improved approach can identify and merge dense regions to form hot areas in the heatmap. For example, a non-parameter density-based clustering algorithm can be used to identify dense regions.

The improved approach described herein has various advantages. For example, detection of hot areas can be automatically driven by data rather than human experience, resulting in identification of hot areas that are consistent with underlying data patterns. Additionally, iteration over all cell values is not required, resulting in improved performance. Further performance improvements can be achieved through concurrent identification of multiple hot areas across the heatmap. Hot areas of different shapes can be identified, since no prior assumptions are made about shapes of hot areas. Also, the improved approach can include flexible parameters, such as a density level setting, which can affect resulting size(s) of detected hot area(s).

FIG. 1 illustrates an example two-dimensional heatmap 102 and an example three-dimensional heatmap 104. In the area of machine learning, heatmap visualizations can be used where data is visualized through variations in coloring.

Heatmaps can be used for cross-examining multivariate data through coloring the cells within tabular data, for example.

Heatmaps visualizations can be used to present various types of information. For example, users may desire to have an analytics tool to present insights regarding variable correlation, such as showing variance across multiple variables, revealing patterns, displaying whether any variables are similar to each other, and notifying if any correlations exist between similar variables. As another example, an analytics application can present information on Shapley values of features, derived from a predictive model. Shapley values can reflect average marginal contribution of feature values across all possible coalitions. Areas of interest on visualizations can include large or small values and can highlight values that possess the most positive or negative influence on a predicted output.

Different colors can be used in a heat map to represent different (e.g., higher or lower) values or ranges of values. For example, a first color (e.g., a certain shade of red 105a) can be used to represent cell values within a certain first range that is at a higher (or highest) range of cell values and a second color (e.g., a certain shade of blue 105b) can be used to represent cell values within a certain second range that is at a lower (or lowest) range of cell values. Other colors can be used for other ranges. Although ranges of cell values are described, in some implementations, a color value is calculated for each cell value. However, certain colors generally represent certain cell values (or ranges of values). In a visual heat map, cells can be displayed using colors that correspond to their cell values. Based on data in an analyzed data set, one or more areas of a heat map may correspond to a group of cells that each have similar cell values (and thus similar or same colors). Some areas corresponding to either particularly high (or particularly low) values may be more interesting to a user. Accordingly, a user's eye can be trained to detect similarly-colored (or certain-colored) areas as areas that may correspond to interesting information. Such areas may be called "hot areas".

When heatmaps are used, a desired feature can be automatic detection of "hot areas," since users may desire to consider potential patterns that can often be identified from the hot areas in a heatmap. Hot areas can refer to areas in a heatmap that may be of more interest to a user than other areas, and users generally desire to give more attention to hot areas. Hot areas can visually correspond to heatmap areas with a high density of similar colors. For example, in the two-dimensional heatmap 102, areas 106 and 108 (among others) can be considered hot areas. In the three-dimensional heatmap 104, positive or negative peaks, such as peaks 110 and 112, can be considered hot areas.

Figure 2:
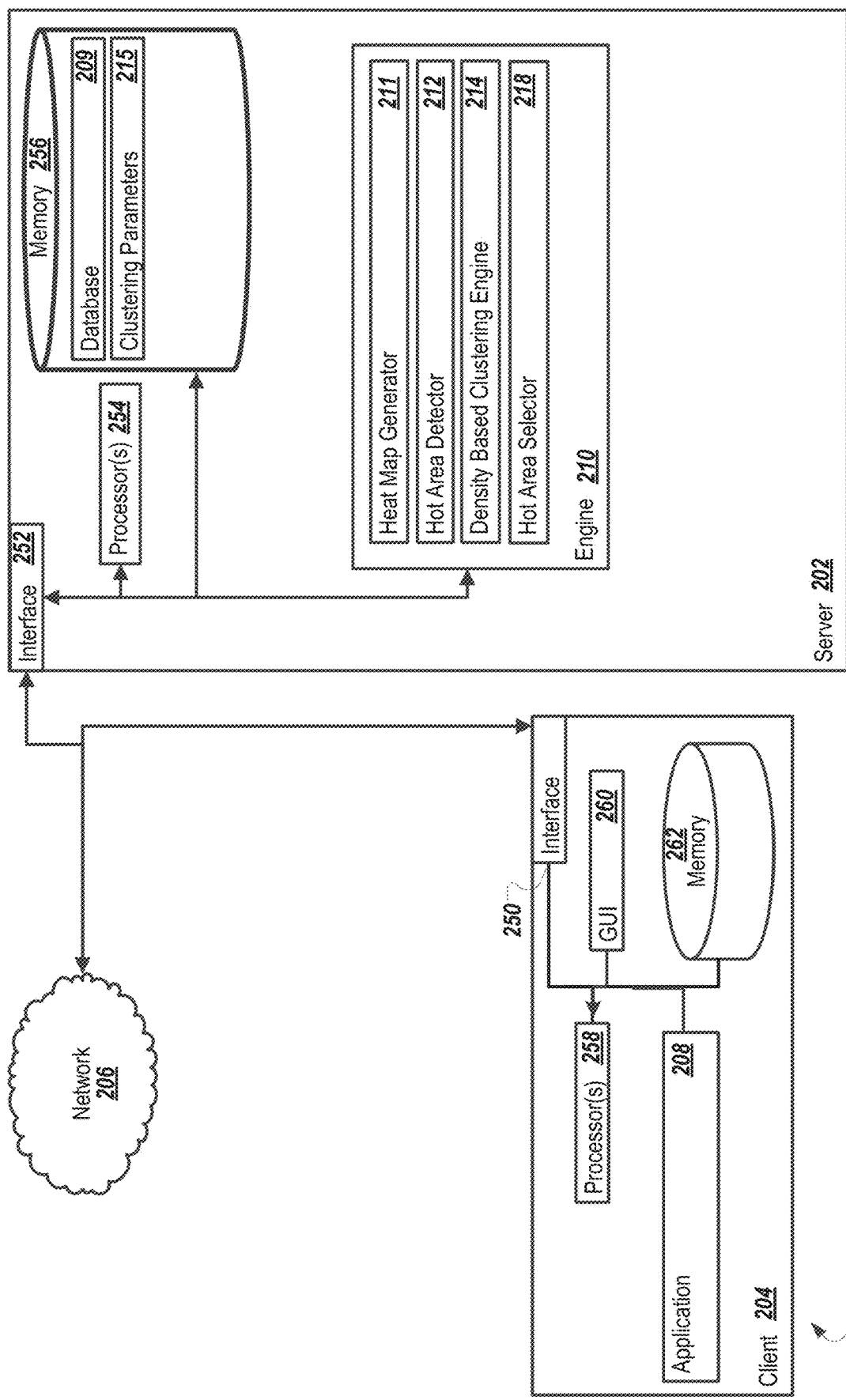
FIG. 2 is a block diagram illustrating an example system for automatically detecting hot areas in heat map visualizations.

FIG. 2 is a block diagram illustrating an example system 200 for automatically detecting hot areas in heat map visualizations. Specifically, the illustrated system 200 includes or is communicably coupled with a server 202, a client device 204, and a network 206. Although shown separately, in some implementations, functionality of two or more systems or servers may be provided by a single system or server. In some implementations, the functionality of one illustrated system, server, or component may be provided by multiple systems, servers, or components, respectively.

A user can use an application 208 to view heat map visualizations for visualizing data in a database 209. An engine 210 on the server 202 includes a heat map generator 211 that can generate a heap map visualization and provide the heat map visualization (or data that the application 208 can use to present the heat map visualization), for presentation of the heat map visualization in the application 208.

Although described as a client-server setup, in some implementations, functionality of some or all of the engine 210 can be implemented in the application 208.

The user may benefit from having hot areas of a heat map automatically identified. A hot area detector 212 can automatically identify one or more hot areas in a heat map. As described in more detail below, the hot area detector 212 can use a density-based clustering engine 214 to cluster cells of the heat map as part of hot area detection. The density-based clustering engine 214 can be tailored using one or more clustering algorithm parameters 215. A hot area selector 218 can select (e.g., highlight) automatically-detected hot areas for the user in the application 208.

As used in the present disclosure, the term "computer" is intended to encompass any suitable processing device. For example, although FIG. 2 illustrates a single server 202, and a single client device 204, the system 200 can be implemented using a single, stand-alone computing device, two or more servers 202, or two or more client devices 204. Indeed, the server 202 and the client device 204 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 202 and the client device 204 may be adapted to execute any operating system, including Linux, UNIX, Windows, Mac OS®, Java™, Android™, iOS or any other suitable operating system. According to one implementation, the server 202 may also include or be communicably coupled with an e-mail server, a Web server, a caching server, a streaming data server, and/or other suitable server.

Interfaces 250 and 252 are used by the client device 204 and the server 202, respectively, for communicating with other systems in a distributed environment—including within the system 200—connected to the network 206. Generally, the interfaces 250 and 252 each comprise logic encoded in software and/or hardware in a suitable combination and operable to communicate with the network 206. More specifically, the interfaces 250 and 252 may each comprise software supporting one or more communication protocols associated with communications such that the network 206 or interface's hardware is operable to communicate physical signals within and outside of the illustrated system 200.

The server 202 includes one or more processors 254. Each processor 254 may be a central processing unit (CPU), a blade, an application specific integrated circuit (ASIC), a field-programmable gate array (FPGA), or another suitable component. Generally, each processor 254 executes instructions and manipulates data to perform the operations of the server 202. Specifically, each processor 254 executes the functionality required to receive and respond to requests from the client device 204, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 2 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 202 includes memory 256. In some implementations, the server 202 includes multiple memories. The memory 256 may include any type of memory or database module and may take the form of volatile and/or non-volatile memory including, without limitation, magnetic media, optical media, random access memory (RAM), read-only memory (ROM), removable media, or any other suitable local or remote memory component. The memory 256 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 202.

The client device 204 may generally be any computing device operable to connect to or communicate with the server 202 via the network 206 using a wireline or wireless connection. In general, the client device 204 comprises an electronic computer device operable to receive, transmit, process, and store any appropriate data associated with the system 200 of FIG. 2. The client device 204 can include one or more client applications, including the prediction application 208. A client application is any type of application that allows the client device 204 to request and view content on the client device 204. In some implementations, a client application can use parameters, metadata, and other information received at launch to access a particular set of data from the server 202. In some instances, a client application may be an agent or client-side version of the one or more enterprise applications running on an enterprise server (not shown).

The client device 204 further includes one or more processors 258. Each processor 258 included in the client device 204 may be a central processing unit (CPU), an application specific integrated circuit (ASIC), a field-programmable gate array (FPGA), or another suitable component. Generally, each processor 258 included in the client device 204 executes instructions and manipulates data to perform the operations of the client device 204. Specifically, each processor 258 included in the client device 204 executes the functionality required to send requests to the server 202 and to receive and process responses from the server 202.

The client device 204 is generally intended to encompass any client computing device such as a laptop/notebook computer, wireless data port, smart phone, personal data assistant (PDA), tablet computing device, one or more processors within these devices, or any other suitable processing device. For example, the client device 204 may comprise a computer that includes an input device, such as a keypad, touch screen, or other device that can accept user information, and an output device that conveys information associated with the operation of the server 202, or the client device 204 itself, including digital data, visual information, or a GUI 260.

The GUI 260 of the client device 204 interfaces with at least a portion of the system 200 for any suitable purpose, including generating a visual representation of the prediction application 208. In particular, the GUI 260 may be used to view and navigate various Web pages, or other user interfaces. Generally, the GUI 260 provides the user with an efficient and user-friendly presentation of business data provided by or communicated within the system. The GUI 260 may comprise a plurality of customizable frames or views having interactive fields, pull-down lists, and buttons operated by the user. The GUI 260 contemplates any suitable graphical user interface, such as a combination of a generic web browser, intelligent engine, and command line interface (CLI) that processes information and efficiently presents the results to the user visually.

Memory 262 included in the client device 204 may include any memory or database module and may take the form of volatile or non-volatile memory including, without limitation, magnetic media, optical media, random access memory (RAM), read-only memory (ROM), removable media, or any other suitable local or remote memory component. The memory 262 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 204.

There may be any number of client devices 204 associated with, or external to, the system 200. For example, while the illustrated system 200 includes one client device 204, alternative implementations of the system 200 may include multiple client devices 204 communicably coupled to the server 202 and/or the network 206, or any other number suitable to the purposes of the system 200. Additionally, there may also be one or more additional client devices 204 external to the illustrated portion of system 200 that are capable of interacting with the system 200 via the network 206. Further, the term "client", "client device" and "user" may be used interchangeably as appropriate without departing from the scope of this disclosure. Moreover, while the client device 204 is described in terms of being used by a single user, this disclosure contemplates that many users may use one computer, or that one user may use multiple computers.

Figure 3:
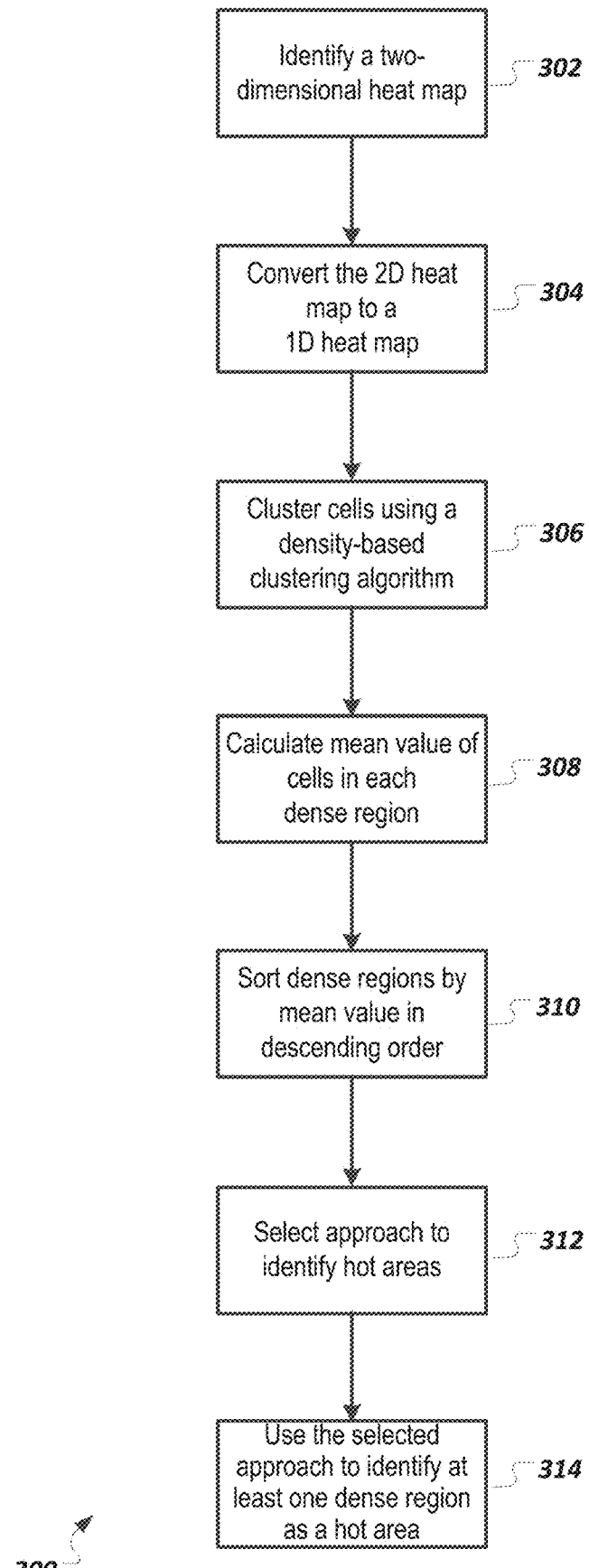
FIG. 3 is a flowchart of an example method for automatically detecting hot areas in heat map visualizations.

FIG. 3 is a flowchart of an example method 300 for automatically detecting hot areas in heat map visualizations. The method 300 does not require domain knowledge of a domain of data in a processed heat map visualization. The method 300 is not based on any predefined hot area shape type (e.g., different-shaped hot areas can be detected and selected).

It will be understood that method 300 and related methods may be performed, for example, by any suitable system, environment, software, and hardware, or a combination of systems, environments, software, and hardware, as appropriate. For example, one or more of a client, a server, or other computing device can be used to execute method 300 and related methods and obtain any data from the memory of a client, the server, or the other computing device. In some implementations, the method 300 and related methods are executed by one or more components of the system 200 described above with respect to FIG. 2. For example, the method 300 and related methods can be executed by the engine 210 of FIG. 2.

At 302, a two-dimensional heat map is identified. The identified heat map can be included in or referenced by a request to automatically identify hot areas in the identified heat map.

At 304, the two-dimensional heat map is converted to (e.g., represented in) one dimension. For example, all cell values of the two-dimensional heat map can be transformed into a one-dimensional data space, where each data point in the one-dimensional data space represents a cell and value for the cell.

At 306, cells of the one-dimensional heat map are clustered using a density-based clustering algorithm to create at least one dense region of cells. For example, a DBSCAN (Density-Based Spatial Clustering of Applications with Noise) algorithm or some other suitable density-based algorithms can be used. The density-based clustering algorithm can identify similar frequently-occurring values, and can subsequently group the similar frequently-occurring values into clusters. The frequently-occurring values correspond to ranges of values that have high probability in the heatmap. Each cluster can represent a dense region of the heat map. The density-based algorithm can have parameter(s) than can be adjusted to control how many clusters are created (and correspondingly, a size of identified dense regions).

For example an epsilon (eps) parameter can be configured to specify how close points should be to each other to be considered a part of a cluster. For example, the density-based clustering algorithm can consider two points as neighbors if the distance between the two points is less than or equal to the eps parameter value. As another example, a minimum-samples parameter can be configured which defines a minimum number of points for forming a dense region. For example, if the minimum-samples parameter is equal to five, then each identified dense region can have at least five points.

At 308, a mean value of cells is calculated for each dense region. The mean value can be associated with (e.g., mapped to) and represent the corresponding dense region.

At 310, dense regions are sorted by mean value in descending order.

At 312, an approach to identify hot areas is selected. For example, the approach can be to identify hot areas with positive peaks, hot areas with negative peaks, or hot areas with either positive or negative peaks. Any suitable approach can be applied.

At 314, the selected approach is used to identify at least one dense region as a hot area of the one-dimensional heat map. For example, N dense regions can be selected as a hot area. A parameter N can be configured (e.g., by a user) that can determine how many dense regions will be included in a hot area. When the approach is identifying positive peaks, N dense regions with highest mean values can be selected and merged to form a hot area. When the approach is identifying negative peaks, N dense regions with lowest mean values can be selected and merged to form a hot area. When the approach is identifying positive and negative peaks, the dense regions with the highest and lowest mean values can be selected and merged to form a hot area.

Figure 4:
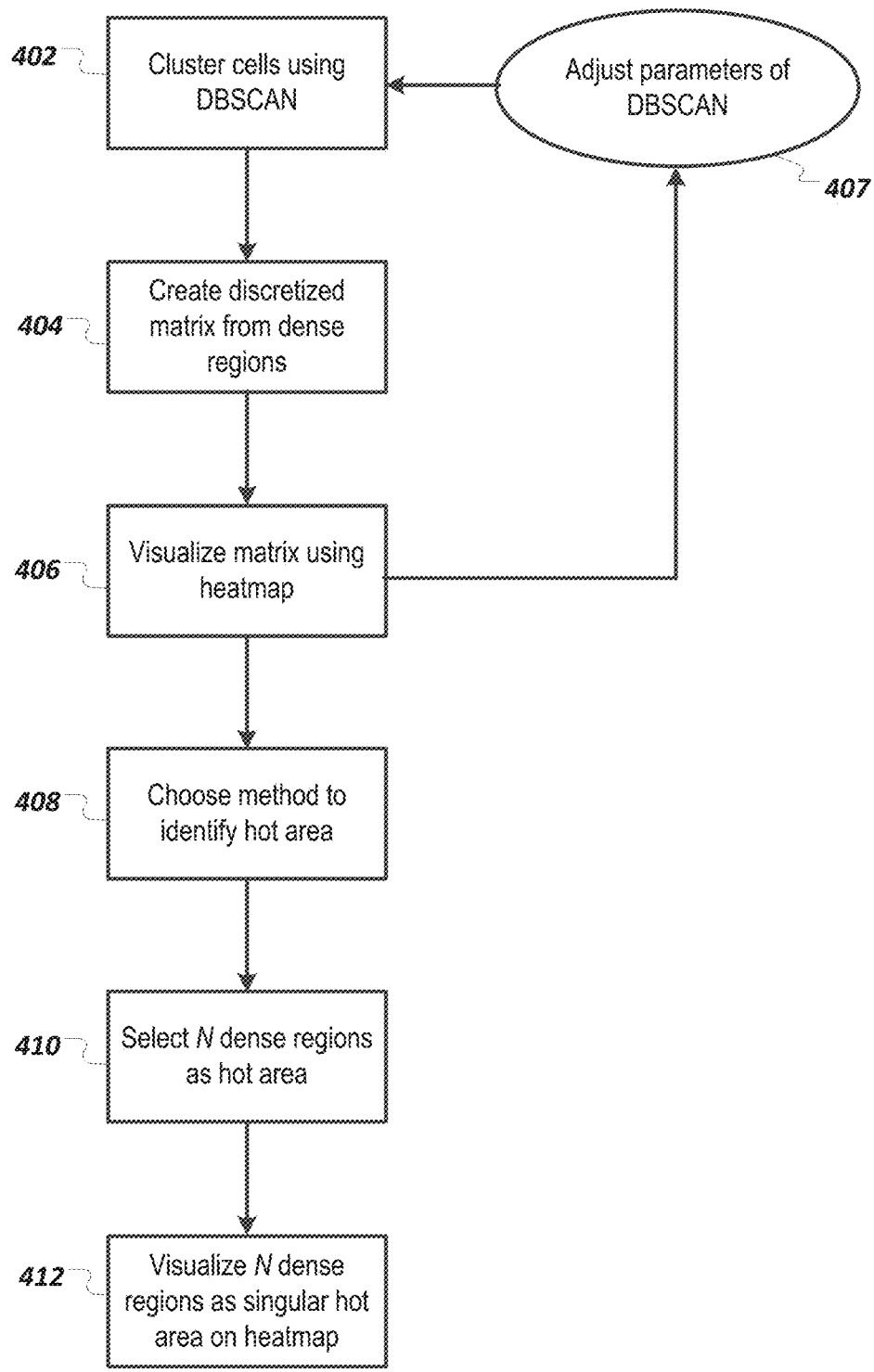
FIG. 4 is a flowchart of an example method 400 for detecting hot areas in a heat map and visualizing the detected hot areas in the heat map.

FIG. 4 is a flowchart of an example method 400 for detecting hot areas in a heat map and visualizing the detected hot areas in the heat map. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 200 described above with respect to FIG. 2. For example, the method 400 and related methods can be executed by the engine 210 of FIG. 2.

At 402, cells are clustered using a DBSCAN (or other density-based) algorithm. Each cluster represents a dense region of the heat map.

At 404, a discrete matrix is created from dense regions. For each dense region, all cell values can be replaced by a mean value present in the corresponding cluster. The discrete matrix can be created and the mean value of each cluster can be mapped to a cell in the discrete matrix, where each cell is populated by the mean value of the cluster to which the original cell is assigned. Use of the discrete matrix can result in a color-smoothing approach in which a smaller number of colors are used as compared to a continuous approach that maps any value to a particular color.

At 406, the matrix is visualized using a heat map. For example, larger values can be highlighted in a particular first color (e.g., red) and smaller values can be highlighted in a particular second color (e.g., blue).

At 407, parameters of the DBSCAN algorithm are optionally adjusted and an adjusted cell clustering can be performed. For example, an eps parameter and/or a minimum-samples parameter can be adjusted. Parameters can be adjusted, for example, and a new discrete matrix can be generated and visualized, to visualize for the user an effect of changing the parameters of the DBSCAN algorithm. Users can experiment with different parameter values, for instance, to find parameter settings that have a desired sensitivity for detecting hot areas. Once parameter have been selected, a tuned DBSCAN algorithm can be used to detect hot areas.

At 408, an approach to identify hot areas is selected. For example, the approach can be to identify hot areas with positive peaks, hot areas with negative peaks, or hot areas with either positive or negative peaks.

At 410, N dense regions are selected as hot areas. N can be a parameter that controls how many dense regions may be identified. When the approach is identifying positive peaks, N dense regions with highest mean values can be selected and merged to form a hot area. When the approach is identifying negative peaks, N dense regions with lowest mean values can be selected and merged to form a hot area. When the approach is identifying positive and negative peaks, the dense regions with the highest and lowest mean values can be selected and merged to form a hot area At 412, the N dense regions are visualized as a singular hot area on the heat map.

Figure 5:
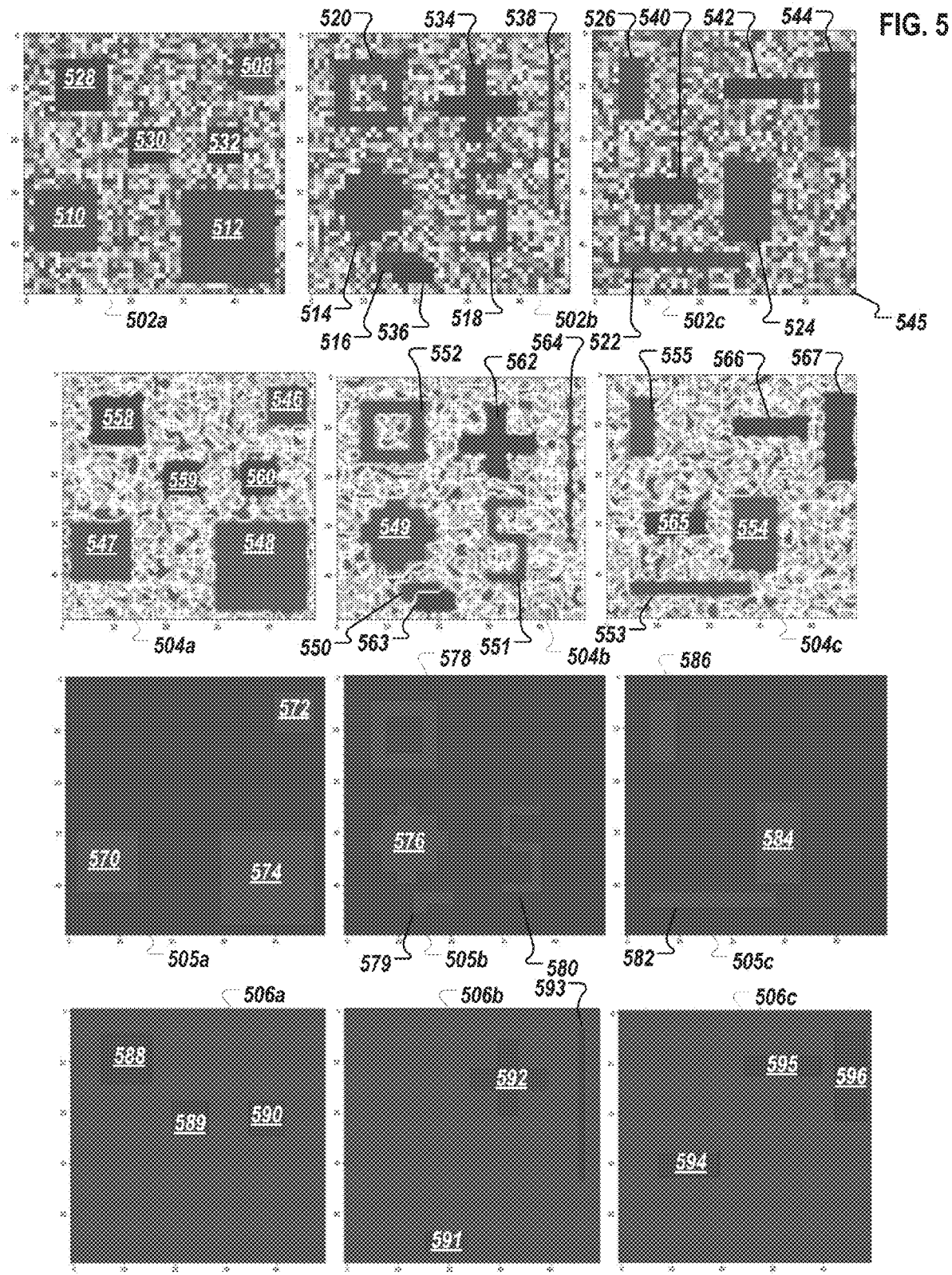
FIG. 5 illustrates example heat maps and contour plots.

FIG. 5 illustrates example heat maps and contour plots. For instance, heatmaps 502a, 502b, and 502c, contour plots 504a, 504b, and 504c, and heat maps 505a, 505b, 505c, 506a, 506b, and 506c are shown. The heat maps 502a, 502b, and 502c are simulated heatmaps that include varying shapes of known hot areas. Values inside known high-value areas 508, 510, 512, 514, 516, 518, 520, 522, 524, and 526 are above a value of 0.9 and are colored in red. Values inside known low-value areas 528, 530, 532, 534, 536, 538, 540, 542, and 544 are below a value of 0.1 and are colored in blue. Noise values in the heatmaps 502a, 502b, and 502c (e.g., a noise-value point 545) range between 0.1 and 0.9.

The contour plots 504a, 504b, and 504c illustrate results of density-based clustering and discretization of the heat maps 502a, 502b, and 502c, respectively. Density-based algorithm parameters for processing each heatmap 502a, 502b, and 502c can be adjusted independently of each other. For example, the contour plots 504a, 504b, and 504c illustrate clustering outputs using eps parameter values of 0.00156, 0.00143, and 0.00155, and minimum-sample parameter values of three, two, and three, respectively. Identified clusters 546, 547, 548, 549, 550, 551, 552, 554, 555, and 556 correspond to the known high-value areas 508, 510, 512, 514, 516, 518, 520, 522, 524, and 526, respectively. Similarly, clusters 558, 559, 560, 561, 562, 563, 564, 565, 566, and 567 correspond to the known low-value areas 528, 530, 532, 534, 536, 538, 540, 542, and 544, respectively.

The heat maps 505a, 505b, and 505c illustrate detection and selection of high-value hot areas from clusters illustrated in the contour maps 504a, 504b, and 504c, respectively. Similarly, the heat maps 506a, 506b, and 506c illustrate detection and selection of low-value hot areas from clusters illustrated in the contour maps 504a, 504b, and 504c, respectively. Clusters identified by the density-based clustering algorithm for the heat map 502a, 502b, or 502c can be sorted by mean value. A highest and/or lowest N number of identified clusters for a respective heat map 502a, 502b, or 502c can be identified as a hot area and visualized in a respective heatmap, as described below. A default value for N can be one, and N can be adjusted until a satisfactory value of N is found based upon visualization(s) and an average value in the clusters.

Results for hot area extraction by including clusters with highest mean values is reflected in the heat maps 505a, 505b, and 505c as red hot areas 570, 572, 574, 576, 578, 579, 580, 582, 584, and 586 (e.g., corresponding to the clusters 546, 547, 548, 549, 550, 551, 552, 554, 555, and 556 and the known high-value areas 508, 510, 512, 514, 516, 518, 520, 522, 524, and 526, respectively). Results for hot area extraction by including clusters with lowest mean values is reflected in the heat maps 506a, 506b, and 506c as blue hot areas 588, 589, 590, 591, 592, 593, 594, 595, and 596 (e.g., corresponding to the clusters 558, 559, 560, 561, 562, 563, 564, 565, 566, and 567 and the known low-value areas 528, 530, 532, 534, 536, 538, 540, 542, and 544, respectively).

Figure 6:
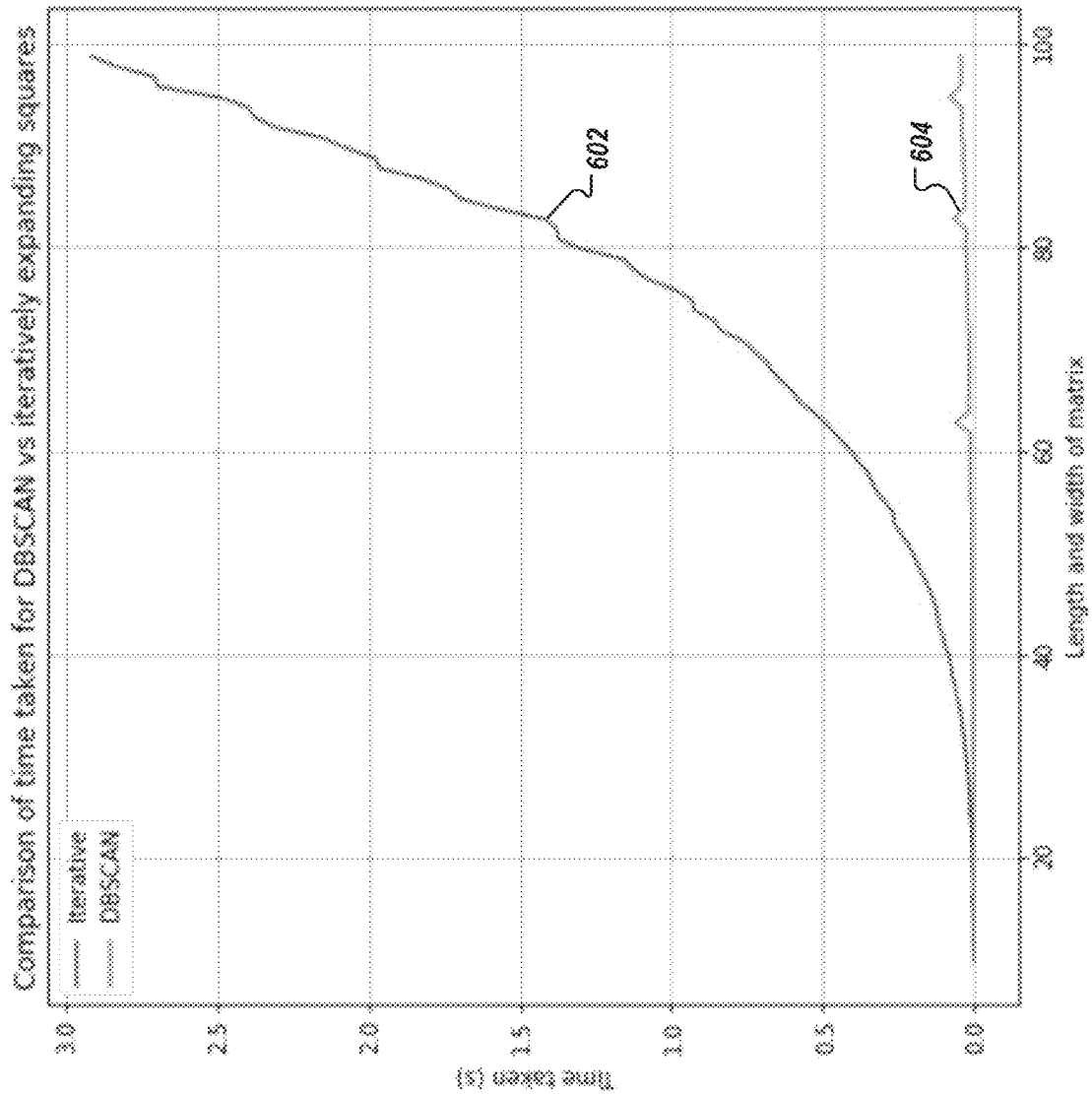
FIG. 6 illustrates a performance graph that compares a density-based clustering approach with an iterative approach

FIG. 6 illustrates a performance graph 600 that compares a density-based clustering approach with an iterative approach. The density-based and iterative approaches can be applied to square matrices of increasing sizes of values, including, for example, random values between zero and one. Performance of the two approaches can be compared. The iterative approach can include expanding squares from an origin point until an edge of the matrix is found, which is followed by shifting the origin diagonally down and to the right and repeating for all origins on the diagonal axis. A curve 602 illustrates a generally exponential increate in processing time for the iterative approach as a length and width of a tested matrix increases.

Comparatively, a curve 604 illustrates a near constant amount of processing time for the density-based clustering approach even as a length and width of a tested matrix increases. The curve 604 illustrates that the density-based approach is better performing and more scalable than the iterative approach. Accordingly, the density-based approach can result in consumption of less computational resources (e.g., processor utilization) than the iterative approach.

The preceding figures and accompanying description illustrate example processes and computer-implementable techniques. But system 200 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 200 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer-implemented method comprising:
   identifying a two-dimensional heat map;
   converting the identified two-dimensional heat map to a single one-dimensional heat map;
   clustering cells of the single one-dimensional heat map using a density-based clustering algorithm to generate a plurality of dense regions of cells, wherein the clustering includes:
   identifying clustering algorithm parameters for a current iteration of clustering, wherein the clustering algorithm parameters include:
   an epsilon parameter that specifies a closeness value of cells for inclusion in a same cluster; and
   a minimum-samples parameter that defines a minimum number of cells for forming a dense region; and
   performing the clustering according to the identified clustering algorithm parameters to generate the plurality of dense regions in the single one-dimensional heat map:
   calculating a mean value of cells in each dense region of the single one-dimensional heat map:
   sorting the plurality of dense regions according to the mean value in descending order;
   selecting an approach for identifying hot areas; and
   using the selected approach to identify a single hot area that includes multiple dense regions of the plurality of dense regions in the single one-dimensional heat map, wherein using the selected approach comprises:
   identifying a dense-region count parameter that specifies how many dense regions of the plurality of dense regions to include in a given single hot area;
   selecting, according to the selected approach, a number of dense regions equal to the dense-region count parameter; and
   merging a plurality of dense regions of the selected number to form the single hot area.

2. The method of claim 1, wherein the density-based clustering algorithm is a DBSCAN (Density-Based Spatial Clustering of Applications with Noise) algorithm.

3. The method of claim 1, wherein the approach is identifying positive peaks.

4. The method of claim 3, wherein using the selected approach comprises:
   selecting one or more regions with highest mean values; and
   merging the selected one or more regions to form the hot area.

5. The method of claim 1, wherein the approach is identifying negative peaks.

6. The method of claim 5, wherein using the selected approach
   comprises: selecting one or more regions with lowest mean values; and merging the selected one or more regions to form the hot area.

7. The method of claim 1, wherein the approach is identifying positive and negative peaks.

8. The method of claim 5, wherein using the selected approach comprises:
    selecting one or more lowest-mean regions having lowest mean values;
    merging the selected one or more lowest-mean regions to form a first hot area;
    selecting one or more highest-mean regions having highest mean values; and
    merging the selected one or more highest-mean regions to form a second hot area.

9. The method of claim 1, further comprising, before sorting the dense regions, replacing the cell values for all cells in each dense region with the mean value for the dens e region.

10. A system comprising:
    one or more computers; and
    a non-transitory computer-readable medium coupled to the one or more computers having instructions stored thereon which, when executed by the one or more computers, caus e the one or more computers to perform operations comprising:
        identifying a two-dimensional heat map;
        converting the identified two-dimensional heat map to a single one-dimensional heat map;
        clustering cells of the single one-dimensional heat map using a density-based clustering algorithm to generate a plurality of dense regions of cells, wherein the clustering includes:
    identifying clustering algorithm parameters for a current iteration of clustering, wherein the clustering algorithm parameters include:
        an epsilon parameter that specifies a closeness value of cells for inclusion in a same cluster; and
        a minimum-samples parameter that defines a minimum number of cells for forming a dense region; and
        performing the clustering according to the identified clustering algorithm parameters to generate the plurality of dense regions in the single one-dimensional heat calculating a mean value of cells in each dense region of the single one-dimensional heat map;
    sorting the plurality of dense regions according to the mean value in descending order;
    selecting an approach for identifying hot areas; and
    using the selected approach to identify a single hot area that includes multiple dense regions of the plurality of dense regions in the single one-dimensional heat map, wherein using the selected approach comprises:
        identifying a dense-region count parameter that specifies how many dense regions of the plurality of dense regions to include in a given single hot area;
        selecting, according to the selected approach, a number of dense regions equal to the dense-region count parameter; and
        merging a plurality of dense regions of the selected number to form the single hot area.

11. The system of claim 10, wherein the density-based clustering algorithm is a DBSCAN (Density-Based Spatial Clustering of Applications with Noise) algorithm.

12. The system of claim 10, wherein the approach is identifying positive peaks.

13. The system of claim 12, wherein using the selected approach comprises:
    selecting one or more regions with highest mean values; and
    merging the selected one or more regions to form the hot area.

14. The system of claim 10, wherein the approach is identifying negative peaks.

15. The system of claim 14, wherein using the selected approach comprises:
    selecting one or more regions with lowest mean values; and
    merging the selected one or more regions to form the hot area.

16. A computer program product encoded on a non-transitory storage medium, the product comprising non-transitory, computer readable instructions for causing one or more processors to perform operations comprising:
    identifying a two-dimensional heat map;
    converting the identified two-dimensional heat map to a single one-dimensional heat map;
    clustering cells of the single one-dimensional heat map using a density-based clustering algorithm to generate a plurality of dense regions of cells, wherein the clustering includes:
        identifying clustering algorithm parameters for a current iteration of clustering, wherein the clustering algorithm parameters include:
            an epsilon parameter that specifies a closeness value of cells for inclusion in a same cluster; and
            a minimum-samples parameter that defines a minimum number of cells for forming a dense region; and
        performing the clustering according to the identified clustering algorithm parameters to generate the plurality of dense regions in the single one-dimensional heat
    calculating a mean value of cells in each dense region of the single one-dimensional heat map;
    sorting the plurality of dense regions according to the mean value in descending order;
    selecting an approach for identifying hot areas; and
    using the selected approach to identify a single hot area that includes multiple dense regions of the plurality of dense regions in the single one-dimensional heat map, wherein using the selected approach comprises:
        identifying a dense-region count parameter that specifies how many dense regions of the plurality of dense regions to include in a given single hot area;
        selecting, according to the selected approach, a number of dense regions equal to the dense-region count parameter; and
    merging a plurality of dense regions of the selected number to form the single hot area.

17. The computer program product of claim 16, wherein the density-based clustering algorithm is a DBSCAN (Density-Based Spatial Clustering of Applications with Noise) algorithm.

18. The computer program product of claim 16, wherein the approach is identifying positive peaks.

19. The computer program product of claim 18, wherein using the selected approach comprises:
    selecting one or more regions with highest mean values; and
    merging the selected one or more regions to form the hot area.

20. The computer program product of claim 16, wherein the approach is identifying negative peaks.

\* \* \* \* \*